Patented Oct. 20, 1953

2,656,378

UNITED STATES PATENT OFFICE 2,656,378

2,2-DIPHENYL-1,3-PROPANEDIOL MONOCARBAMATE

Frank M. Berger, Princeton, and Bernard J. Ludwig, North Brunswick, N. J., assignors to Carter Products, Inc., New York, N. Y., a corporation of Maryland No Drawing. Application January 4, 1952,
Serial No. 265,056

1 Claim.  (Cl. 260—482)

This invention relates to organic chemistry and has for its object the provision of a new organic compound. The new compound of our invention is 2,2-diphenyl-1,3-propanediol monocarbamate which may be represented by the formula

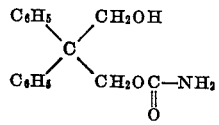

The compound may also be named 2,2 - diphenyl-3-hydroxypropyl carbamate. The compound is a white crystalline solid melting at from 121°–122° C., it is only slightly soluble in water at ordinary room temperature, and has exceptional anticonvulsant properties.

The 2,2 - disubstituted - 1,3 - propanediols are short acting anticonvulsant drugs and the dicarbamate derivatives have a longer duration of anticonvulsant action. The monocarbamates in general resemble the parent compounds, the diols, in that they have a short duration of activity. We have discovered, however, that 2,2-diphenyl-1,3-propanediol monocarbamate possesses an unexpectedly long duration of anticonvulsant activity. It was surprising also that the corresponding dicarbamate, 2,2-diphenyl-1,3-propanediol dicarbamate, has very low activity, even below that of the parent diol. The near homologs of the monocarbamate also have low activity. The anticonvulsant properties of 2,2-diphenyl-1,3-propanediol monocarbamate are abnormal in comparison with its most closely related compounds.

The compound of the invention can be prepared by the low temperature reaction of 1 mole of 2,2-diphenyl-1,3-propanediol with 1 mole of phosgene in an inert medium in the presence of a tertiary amine followed by the conversion of the chlorocarbonate derivative to the desired amide. One suitable method of preparing 2,2-diphenyl-1,3-propanediol is described by Dieter G. Markees and Alfred Burger, J. A. C. S., 71: 2034, 1949. However, because of the presence of two reactive centers in both of the reactants (diol and phosgene) this procedure yields, in addition to the desired monocarbamate derivative, considerable amounts of unreacted diol as well as the dicarbamate. The difficulty of separating these products is avoided by forming the monocarbamate through ammonolysis of the cyclic carbonate ester. The latter compound was prepared by the reaction of equimolar quantities of phosgene and the diol under controlled conditions. The preferred method of preparing 2,2-diphenyl -3- hydroxypropyl carbamate involves the following equation:

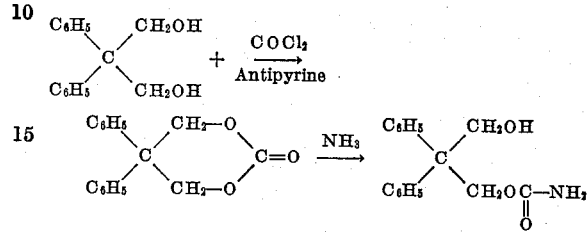

The following is an example of one method of producing the compound of the invention:

Fifteen parts of 2,2-diphenyl-1,3-propanediol and 25 parts of antipyrine are dissolved while stirring in 150 parts of chloroform. To this solution there is added with continuous stirring 7 parts of phosgene dissolved in 150 parts of chloroform, at a rate sufficient to maintain the temperature of the reaction at from 10° C. to 15° C. Stirring is continued and the mixture is allowed to warm to approximately 25° C. Any solid antipyrine hydrochloride that separates on standing is removed by filtration, and the filtrate is concentrated by removal of the major portion of the solvent. The concentrate is freed from water-soluble components by water extraction. Upon removal of the remaining solvent, there is obtained from 5 to 10 parts of the cyclic carbonate ester of 2,2-diphenyl-1,3-propanediol. Recrystallization from ethyl alcohol gives a product melting at from 156° to 158° C. Twenty-five parts of the carbonate and 9 parts of liquid ammonia are placed in a steel pressure vessel and allowed to warm to room temperature. After standing for from 24 to 72 hours, the contents of the vessel are removed, the excess ammonia allowed to evaporate, and the residue recrystallized from water. From 20 to 25 parts of 2,2 - diphenyl - 1,3 - propanediol monocarbamate (2,2-diphenyl-3-hydroxypropyl carbamate) are obtained. The compound has a melting point 121–122° C. Analysis calculated for $C_{16}H_{17}NO_3$: C 71.28; H 6.39; N 5.21. Found by analysis: C 70.83; H 6.27; N 5.17.
We claim:
The compound 2,2 - diphenyl - 1,3 - propanediol monocarbamate which is represented by the formula
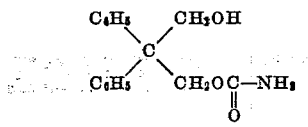
FRANK M. BERGER.
BERNARD J. LUDWIG.
References Cited in the file of this patent
FOREIGN PATENTS
| Number | Country | Date |
|---|---|---|
| 614,295 | Great Britain | Dec. 13, 1948 |
OTHER REFERENCES
Berger, Chemical Abstracts, vol. 43, p. 8546 (1949).